July 9, 1940.  A. M. STONER  2,207,230
SELF-TIGHTENING CHUCK
Filed July 8, 1938  2 Sheets-Sheet 1
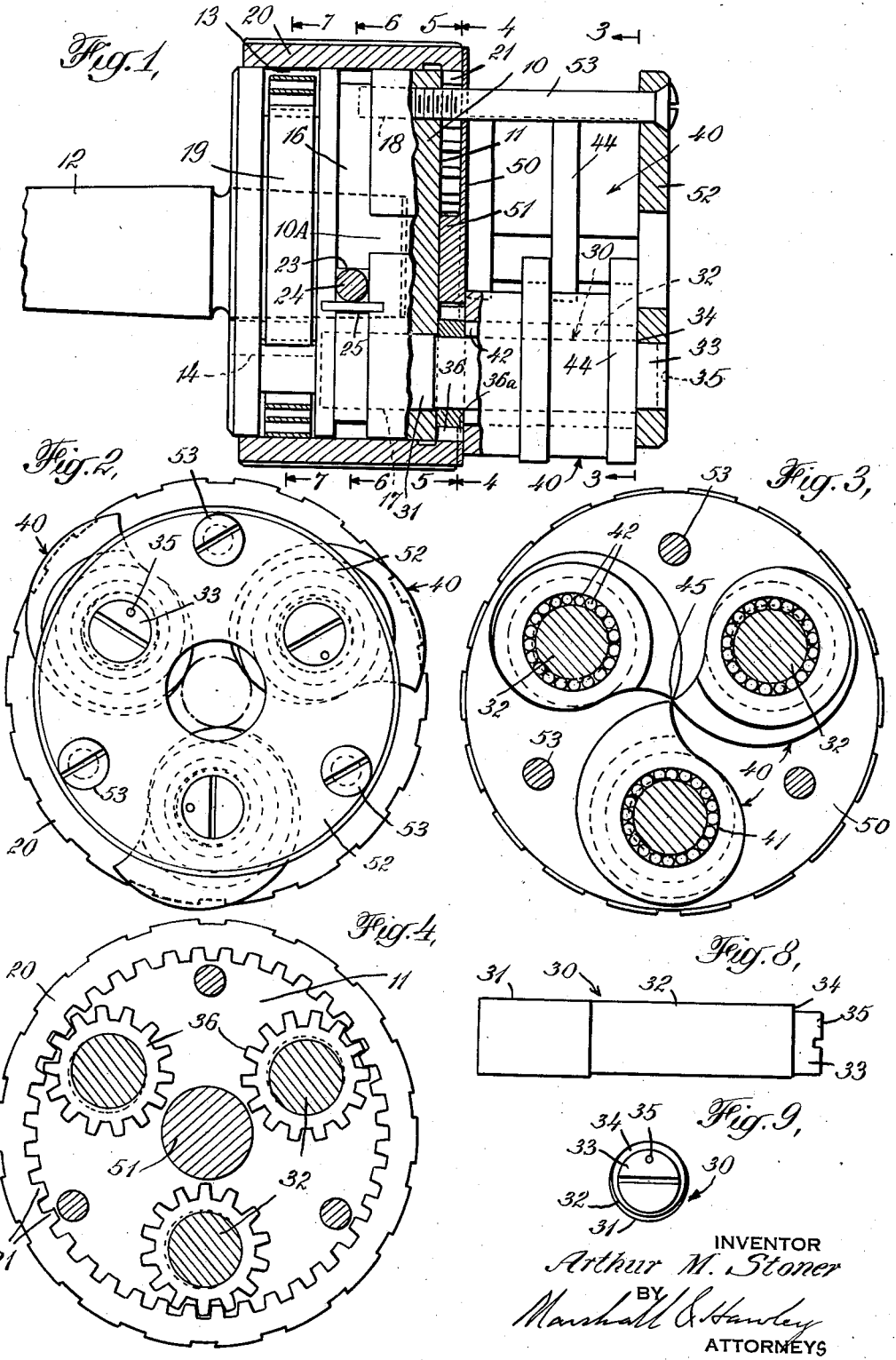

July 9, 1940. A. M. STONER 2,207,230
SELF-TIGHTENING CHUCK
Filed July 8, 1938 2 Sheets-Sheet 2
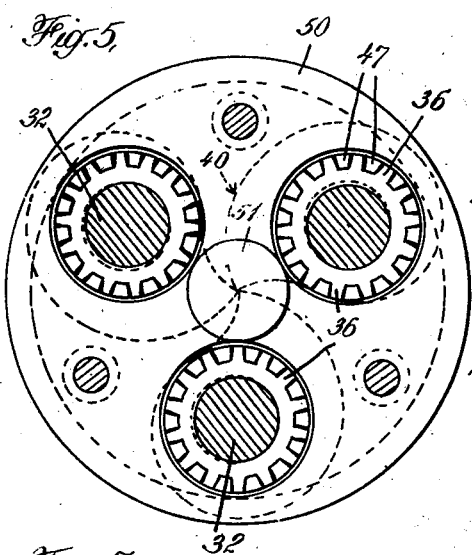
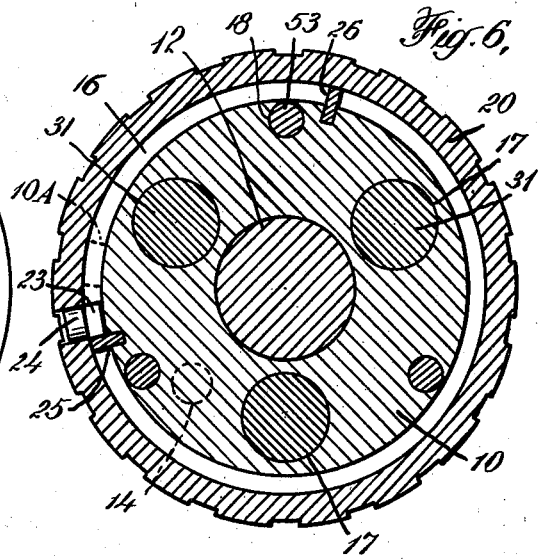
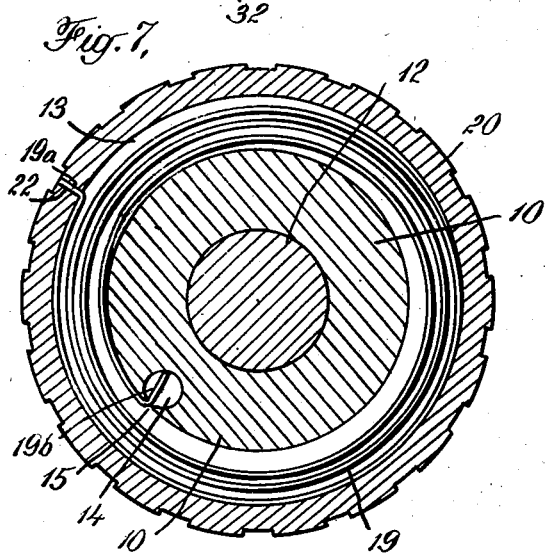
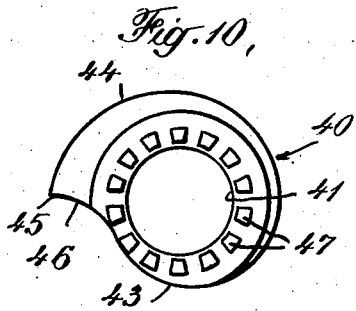
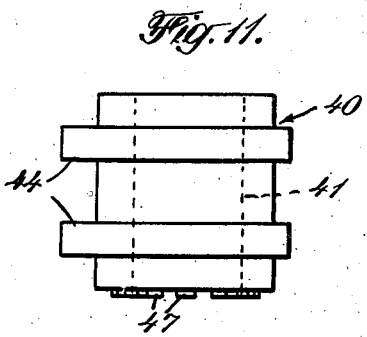
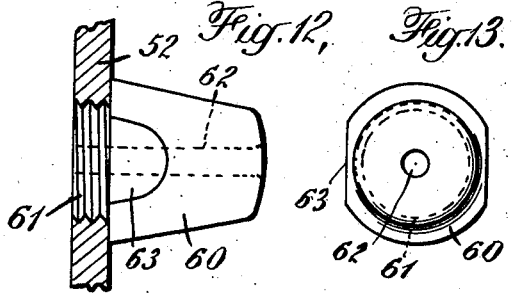
INVENTOR
Arthur M. Stoner
BY
Marshall & Hawley
ATTORNEYS Patented July 9, 1940

2,207,230

UNITED STATES PATENT OFFICE 2,207,230

SELF-TIGHTENING CHUCK

Arthur Merrick Stoner, West Hartford, Conn., assignor to The Jacobs Manufacturing Company, Hartford, Conn., a corporation of Connecticut Application July 8, 1938, Serial No. 218,111

4 Claims. (Cl. 279—33)

This invention relates to improvements in self-tightening chucks.

Its object is to improve such devices and particularly to provide a simple arrangement for adjusting the gripping jaws.

It is well known that although chucks of the type which depend upon the simultaneous movement of a plurality of eccentric gripping jaws for engaging a tool, grip the tool firmly, it is difficult to release the tools from the chuck.

Another object of my invention is to provide by a simple expedient, an arrangement whereby the tools may be easily released regardless of the tightness by which they are gripped.

A further object is to so construct the chuck that it may be easily manufactured and assembled without sacrificing its strength or its wearing qualities.

These and other objects of the invention will appear in the following specification in which I will describe a chuck which embodies the invention, the novel features of which will be set forth in appended claims.

Referring to the drawings,

Fig. 1 is a side elevation partly in section of a chuck which is made according to and embodies this invention;

Fig. 2 is a front elevation of the chuck shown in Fig. 1;

Figs. 3, 4, 5, 6 and 7 are sectional end elevations of the same chuck, the sections being taken respectively on the lines 3—3, 4—4, 5—5, 6—6 and 7—7 of Fig. 1;

Figs. 4 and 5 are sections taken in the same plane, but from opposite directions, as indicated by the arrows on lines 4—4 and 5—5 in Fig. 1;

Fig. 8 is an elevation, and Fig. 9 an end view of one of the adjusting posts for the chuck jaws;

Fig. 10 is an inverted plan view of one of the gripping jaws;

Fig. 11 is an elevation of the jaw shown in Fig. 10;

Fig. 12 is a side elevation of a drill support affixed to the clamping plate, a part of which is shown in section; and Fig. 13 is a front elevation of the drill support shown in Fig. 12.

10 designates the substantially cylindrical body of the chuck having a transverse face 11. 12 is an arbor tapered to fit an axial hole in the body and adapted to fit the driven socket of a machine tool, such as a power drill. 13 is an annular groove near the rear end of the body. 14 is a hole drilled in the body, parallel with its axis, so positioned that its periphery very slightly intersects the base of groove 13 so that a slot 15 is formed parallel with the axis of the body (Figs. 1 and 7). 16 is another annular groove in the body.

Three post holes 17 are drilled into the body from its outer face. These are equally spaced angularly and are at equal distance from the central axis of the body. Between them are tapped holes 18.

20 is a sleeve rotatably supported on the body 10. At its forward end is an internally toothed flange 21 which overlaps the outer face 11 of the body. A slot 22 is cut through the sleeve parallel with the slot 15. A spiral spring 19 lies in the groove 13. One of its ends 19a is bent outwardly into slot 22 and its other end 19b extends inwardly through slot 15 into the hole 14. The edge of slot 15, with which the spring contacts, is rounded to prevent wear. This arrangement is such as to cause sleeve 20 to rotate on body 10 in an anticlockwise direction as viewed from the front of the chuck (Fig. 7). It may be rotated in the opposite direction by hand, by the operator grasping the outer surface of the sleeve which is fluted, as shown, to facilitate such operation.

The relative movement between the sleeve and the body is limited by the arrangement which I will now describe. A pin which has a square end 23 and a cylindrical portion 24, is supported by the sleeve. The cylindrical portion 24 extends into a radial hole in the sleeve and its square end moves in the slot 16. A longitudinal groove 10A is cut in the surface of the body 10 to permit assembling. Woodruff keys 25, 26 are set into the body across the groove 16 in the path of movement of the part 23 of the pin, to arrest its movement.

Adjusting posts, designated generally by 30, are formed with cylindrical portions 31 which fit the holes 17 and are seated on the bottoms of these holes. Each post has a cylindrical part 32 slightly eccentric to the part 31. The outer end 33 of each post is of reduced diameter so that a shoulder 34 is formed between it and the eccentric portion 32. This outer end is provided with a screw driver slot and on its end has a mark 35 which indicates the highest part of the eccentric portion in relation to the axis of the part 31.

Pinions 36 fit the parts 32 of the posts rotatively. These engage the teeth of the flanged rim 21 of sleeve 20. They are of sufficient thickness to extend, when seated on the face 11 of body 10, beyond the flange 21, as shown at 36a in Fig. 1.

40 designates the clamping jaws. These have cylindrical bores 41 which fit the eccentric portions 32 of the posts with interposed rollers 42. Each jaw has a body with an eccentric portion 43 and spaced eccentric ribs 44, terminating in sharp edges 45 from which they are under-cut on a curve 46 (Fig. 10), back to the part of the body portion 43 which is nearest the axis of the bore 41. The contour of the ribs 44 is alike on all of the jaws, but they are spaced differently on each jaw, as shown in Fig. 1, so that their edges 45 can be moved together to a common axis, as shown in Fig. 3.

From one end of each jaw, a row of crown teeth 47 projects. These are concentric with the bore 41 and their outer diameter is somewhat less than that of the body portion 43. When assembled these teeth fit between the parts 36a of the pinion teeth which extend above the rim teeth 21, as shown in Figs. 1 and 5.

50 is a cover plate which is provided with clearance holes for the teeth 47. This lies on the front surface of the flange 21 in the space between it and the lower ends of the body portions 43 of the clamping jaws which abut it. This cover plate may also have a central boss 51 which extends to and rests upon the face 11 of the chuck body 10.

52 is a clamping plate having perforations through which the ends 33 of the adjusting posts extend. This clamping plate rests on the shoulders 34 of the posts. It is held in place by screws 53 which pass through it and into engagement with the threaded holes 17 in the body 10.

When the parts are assembled, the adjusting posts may be so positioned that their marks 35 are on lines at right angles to radial lines from the center of the chuck through the center of the posts, as shown in Fig. 2.

The teeth 47 are so positioned in relation to the teeth of pinions 36 that the edges 45 of the ribs 44 of the clamping jaws are approximately in the axis of the body 10 when the sleeve is moved in relation to body 10 by spring 19 to its extreme position. This is shown in Fig. 3.

With former structures of this kind it has been impossible to adjust the clamping jaws to the nicety which is essential to hold a drill in the exact center of rotation of the chuck. This adjustment can be made quickly and accurately by the arrangement disclosed herein. It is only necessary to turn the adjusting posts 30 to the right or left to move the jaws toward or from the axis of the chuck. That this may be done to an infinitesimal degree may be seen from the fact that with the specific amount of eccentricity of the parts 32 from the axis of the parts 31 which I use, a 90° rotation of a post 30 gives a maximum adjustment of .0015 inch. After this adjustment has been made the screws 53 are tightened and the clamping plate holds the posts 30 in position.

Another disadvantage of structures of this kind is that when the angularity of the gripping jaws is sufficiently low to produce the necessary grip on the inserted tool, it is difficult to release them. In my structure the roller bearings overcome this difficulty. They do not affect the adjustment of the jaws when they are gripping because the spring 19 exerts an equal pressure upon them. The first effect of turning the sleeve 20 on body 10 to release the tool is not frictionally resisted and its initial movement, which diminishes the gripping pressure and unlocks the jaws, is easily effected.

The chuck can be easily operated while in rotation. A slight pressure of the hand on the sleeve is sufficient to move the jaws from their fully closed position shown in Fig. 3 toward their fully opened position shown in Fig. 2. Then a tool is inserted and the hand released. The spring moves the jaws inwardly and the grip on the tool is instantaneous and self-tightening. If this release of the chuck while in rotation is not desired, the spring may be omitted.

The gripping jaws and their supporting parts are uncovered and are open for inspection. This cage-like construction of the front end of the chuck materially reduces its diameter and increases its utility.

Drills of small diameter are easily bent and to prevent this I have provided the drill support shown in Figs. 12 and 13. In this case the central bore of the clamping plate is threaded to receive the boss 61 of a bushing 60 which projects beyond the clamping plate and has a central bore 62 to receive the drill. Its sides are flattened as at 63 to receive a wrench.

Structural modifications may be made within the scope and spirit of this invention. For example, it is not essential that the axes of the gripping jaws be parallel with the axis of the body, but they may be inclined to converge toward a point in the axis of the body, in which case the gripping jaws would be conical. I intend no limitations other than those imposed by the appended claims.

What I claim is:

1. A chuck comprising a body, a sleeve rotatively supported by the body, gripping jaws pivotally mounted on posts rotatable about the axis of the body, means for causing the movement of the sleeve on the body to impart a simultaneous rotation of the jaws on said posts, and eccentric connections between the posts and the body so constructed and arranged that the distance of each post from the axis of the body may be varied micrometrically by a rotational adjustment of the post.

2. A chuck comprising a body, a sleeve rotatively supported by the body, angularly spaced posts rotatively supported in and extending from the body in axes rotatable about the axis of the body, said posts being rotatably adjustable in their supports and having portions eccentric to the axes of their supports, gripping jaws pivotally mounted on the eccentric portions of the posts, and means for causing the movement of the sleeve on the body to impart a simultaneous rotative movement of the jaws on the posts.

3. A chuck jaw mounting comprising a support constructed with a cylindrical opening, a post having a cylindrical end portion adjustably rotatable in said opening, a body eccentric to said end portion, means for locking the post in its adjusted position, and an eccentric chuck jaw mounted to rotate on said body.

4. A chuck jaw mounting comprising a support constructed with a cylindrical opening, a post having a cylindrical inner end portion adjustably rotatable in said opening, a body eccentric to said inner end portion and a smaller outer end portion, an eccentric chuck jaw mounted to rotate on said body, a clamping member on said outer end portion of the post, and means for connecting the clamping member with the support.

ARTHUR MERRICK STONER.